(12) United States Patent
Kanamori (10) Patent No.: US 9,355,395 B2
(45) Date of Patent: May 31, 2016

(54) POS TERMINAL APPARATUS AND COMMODITY SPECIFICATION METHOD (71) Applicant: TOSHIBA TEC KABUSHIKI KAISHA, Shinagawa-ku, Tokyo (JP)

(72) Inventor: Keiko Kanamori, Shizuoka-ken (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 23 days.

(21) Appl. No.: 14/162,891

(22) Filed: Jan. 24, 2014

(65) Prior Publication Data

US 2015/0213429 A1 Jul. 30, 2015

(51) Int. Cl.
G06Q 20/20 (2012.01)
G07G 1/00 (2006.01)
G07G 1/12 (2006.01)

(52) U.S. Cl.
CPC ............ *G06Q 20/208* (2013.01); *G07G 1/0063* (2013.01); *G07G 1/12* (2013.01)

(58) Field of Classification Search
CPC ... G06Q 20/20; G06Q 20/201; G06Q 20/208; G07G 1/0063; G07G 1/12
USPC .......................................................... 705/16
See application file for complete search history.

(56) References Cited

U.S. PATENT DOCUMENTS

| 5,734,839 A * | 3/1998 | Enoki et al. ...................... 705/20 |
| 8,494,908 B2 * | 7/2013 | Herwig ................ G06Q 20/201 705/16 |
| 2009/0039164 A1 * | 2/2009 | Herwig et al. ........... 235/462.41 |
| 2010/0086192 A1 * | 4/2010 | Grigsby et al. ................ 382/141 |
| 2014/0180857 A1 * | 6/2014 | Jacobs ............................ 705/23 |

OTHER PUBLICATIONS

Patents; patent application titled "self-checkout method and apparatus" under review. (2012). Entertainment Newsweekly, , 381. Retrieved from http://search.proquest.com/docview/1124266835?accountid=14753.*

* cited by examiner

*Primary Examiner* — Scott Zare
(74) *Attorney, Agent, or Firm* — Amin, Turocy & Watson LLP; Gregory Turocy (57) ABSTRACT In accordance with one embodiment, a POS terminal apparatus comprises a first interface and a control section. The first interface receives image data obtained by capturing a commodity purchased by a customer. The control section extracts a commodity belonging to a first group from a plurality of pre-registered commodities, compares feature amount of each commodity in the first group with that of an object in the image data, and compares, if a commodity corresponding to the object in the image data is not in the first group, feature amount of a commodity not belonging to the first group with that of the object.

14 Claims, 6 Drawing Sheets

POS TERMINAL APPARATUS AND COMMODITY SPECIFICATION METHOD

FIELD

Embodiments described herein relate to a technology using an image recognition technology.

BACKGROUND

In a POS (Point of sale) terminal apparatus used in a supermarket and the like, commodities are put in front of a scanner one by one and commodity information is instantly read from, for example, a barcode to achieve a fast checkout processing.

In the conventional POS terminal apparatus, barcodes respectively attached on commodities are read by a dedicated scanner, thereby carrying out a checkout processing. However, since it is difficult to directly attach a barcode to perishable foods such as vegetables and fruits, thus, an operator selects and inputs candidates displayed on a cashier, which leads to a problem of low-efficient checkout.

In order to address such a problem, in recent years, a POS terminal apparatus using an object recognition technology is being developed which calculates feature amount of a commodity when an object is directly put in front of a scanner and compares the calculated feature amount with a pre-created dictionary file to recognize the object.

In this way, during an object recognition processing, a matching processing is carried out in all recognition dictionaries in sequence, thus causing a problem that the greater the size (the number of the registration commodities) of a comparison target dictionary is, the longer the time is taken.

DETAILED DESCRIPTION

In accordance with one embodiment, a POS terminal apparatus comprises a first interface and a control section. The first interface receives image data obtained by capturing a commodity purchased by a customer. The control section extracts a commodity belonging to a first group from a plurality of pre-registered commodities, compares feature amount of each commodity in the first group with that of an object in the image data, and compares, if a commodity corresponding to the object in the image data is not in the first group, feature amount of a commodity not belonging to the first group with that of the object.

A FLU file (dictionary), in which the codes of a plurality of commodities sold in a store are registered in advance, is stored in the POS terminal apparatus described herein. The POS terminal apparatus acquires an image displaying a commodity purchased by a customer and then retrieves a commodity accordant with the commodity (object) from the FLU file through an object recognition processing.

The POS terminal apparatus described herein sets a priority for each commodity registered in the PLU file when carrying out an object recognition processing. The POS terminal apparatus sets a priority order in such a manner that the commodities registered in the shopping list created by the customer in advance and the commodities purchased by the customer in the past are prior and carries out an object recognition processing according to the order. In this way, the processing time is shortened while a recognition result with high precision can be achieved.

Embodiments of the present invention are described below with reference to accompanying drawings.

Figure 1:
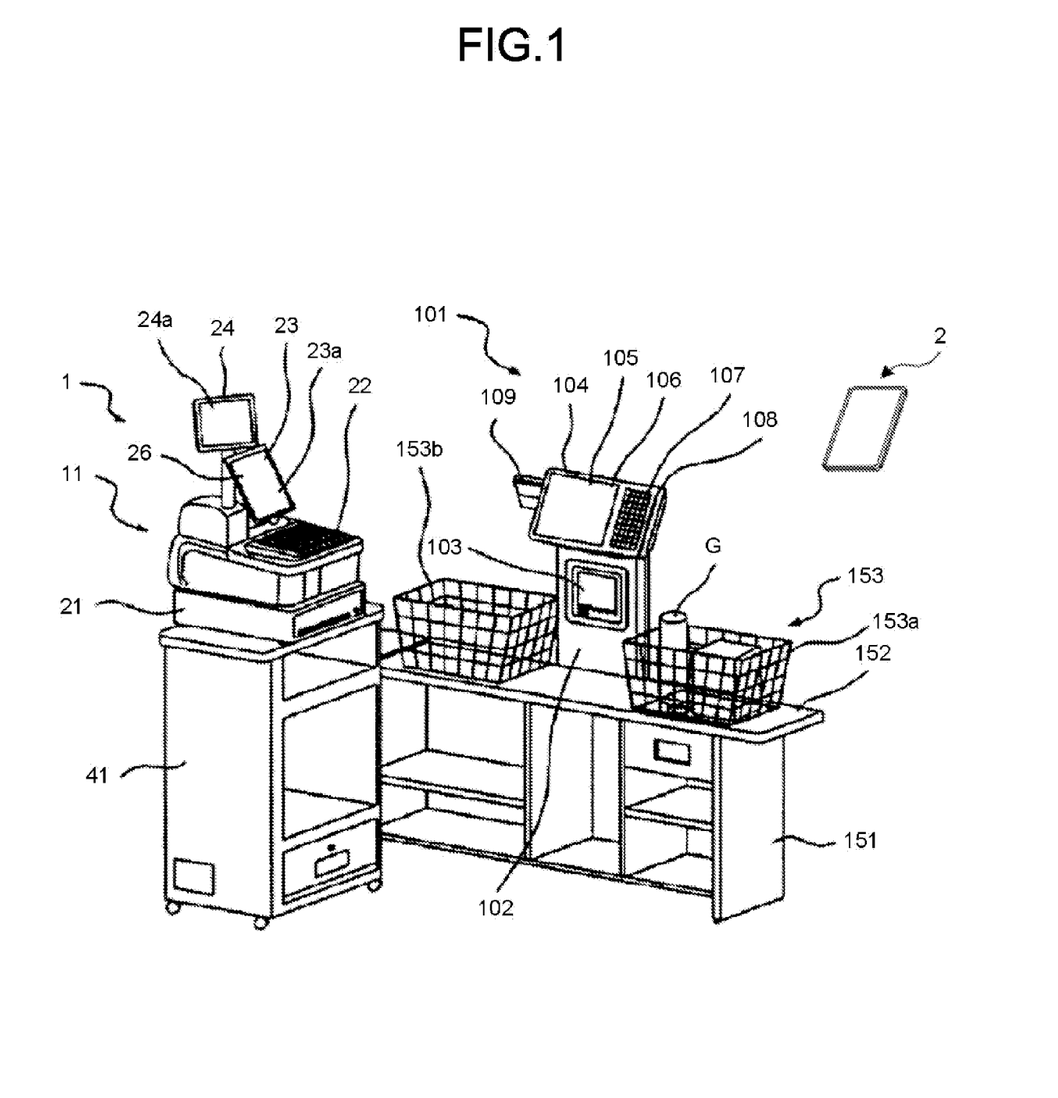
FIG. 1 is a perspective view of a system according to an embodiment.

FIG. 1 is a diagram illustrating an example of the appearance of a checkout system and a portable terminal. A portable terminal 2 will be described in detail later. As shown in FIG. 1, a checkout system 1 comprises a commodity reading apparatus 101 for reading information relating to a commodity and a POS terminal 11 for registering and settling commodities in a transaction. Further, the same components shown in the accompanying drawings are denoted by the same reference signs and are therefore not described repeatedly in the following description.

The POS terminal 11 is arranged on the upper surface of a drawer 21 on a checkout table 41. The drawer 21 is opened under the control of the POS terminal 11. A keyboard 22 is arranged on the upper surface of the POS terminal 11 for an operator to operate. Seen from the operator, a display device 23 is arranged facing the operator to display information at a position more rear than the keyboard 22. The display device 23 displays information on a display screen 23a thereof. A touch panel 26 is laminated on the display screen 23a. A rotatable display for customer 24 is arranged at a position more rear than the display device 23.

A horizontally long table-shaped counter table 151 is arranged to form an L shape with the checkout counter 41 on which the POS terminal 11 is arranged. A commodity receiving surface 152 is formed on the upper surface of the counter table 151. A shopping basket 153 for placing a commodity G is arranged on the commodity receiving surface 152. It can be considered to classy the shopping basket 153 into a first shopping basket 153a which is held by a customer and a second shopping basket 153b which is arranged opposite to the first shopping basket 153a across the commodity reading apparatus 101. Further, the shopping basket 153, which is not limited to be in the shape of a basket, may also be in a tray shape. Further, the second shopping basket 153b, which is not limited to be in the shape of a basket, may also be in a box or bag shape.

The commodity reading apparatus 101, which is connected with the POS terminal 11 to be capable of carrying out data transmission/reception with the POS terminal 11, is arranged on the commodity receiving surface 152 of the counter table 151. The commodity reading apparatus 101 has a thin rectangular housing 102. A reading window 103 is arranged on the front side of the housing 102. A display and operation section 104 is arranged on the upper portion of the housing 102. A display device 106 having a touch panel 105 laminated on the surface thereof is arranged on the display and operation section 104. A keyboard 107 is arranged at the right side of the display device 106. A card reading slit 108 of a card reader (not shown) is arranged at the right side of the keyboard 107. Seen from the operator, a display for customer 109 is arranged at a left rear side at the back side of the display and operation section 104 so as to provide information for a customer.

The commodity reading apparatus 101 comprises a commodity reading section 110 (refer to FIG. 2), which has an image capturing section 164 (refer to FIG. 2) at the rear side of the reading window 103.

A commodity G is placed in the first shopping basket 153a held by a customer. The commodity G in the first shopping basket 153a is moved into the second shopping basket 153b by an operator operating the commodity reading apparatus 101. When moved, the commodity G faces the reading window 103 of the commodity reading apparatus 101. At this time, the image capturing section 164 (refer to FIG. 2) arranged in the reading window 103 captures an image of the commodity G.

The commodity reading apparatus 101 sends the image captured by the image capturing section 164 to the POS terminal 11. The POS terminal 11 determines, through an object recognition processing, which one of the commodities registered in a PLU file F1 (refer to FIG. 4A) which will be described later the commodity G is corresponding to. The POS terminal 11 records, based on a specified commodity code, information relating to sales registration, such as a commodity classification, a commodity name, a unit price and the like, of the commodity corresponding to the specified commodity code in a sales master file (not shown), and then carries out a sales registration.

Figure 2:
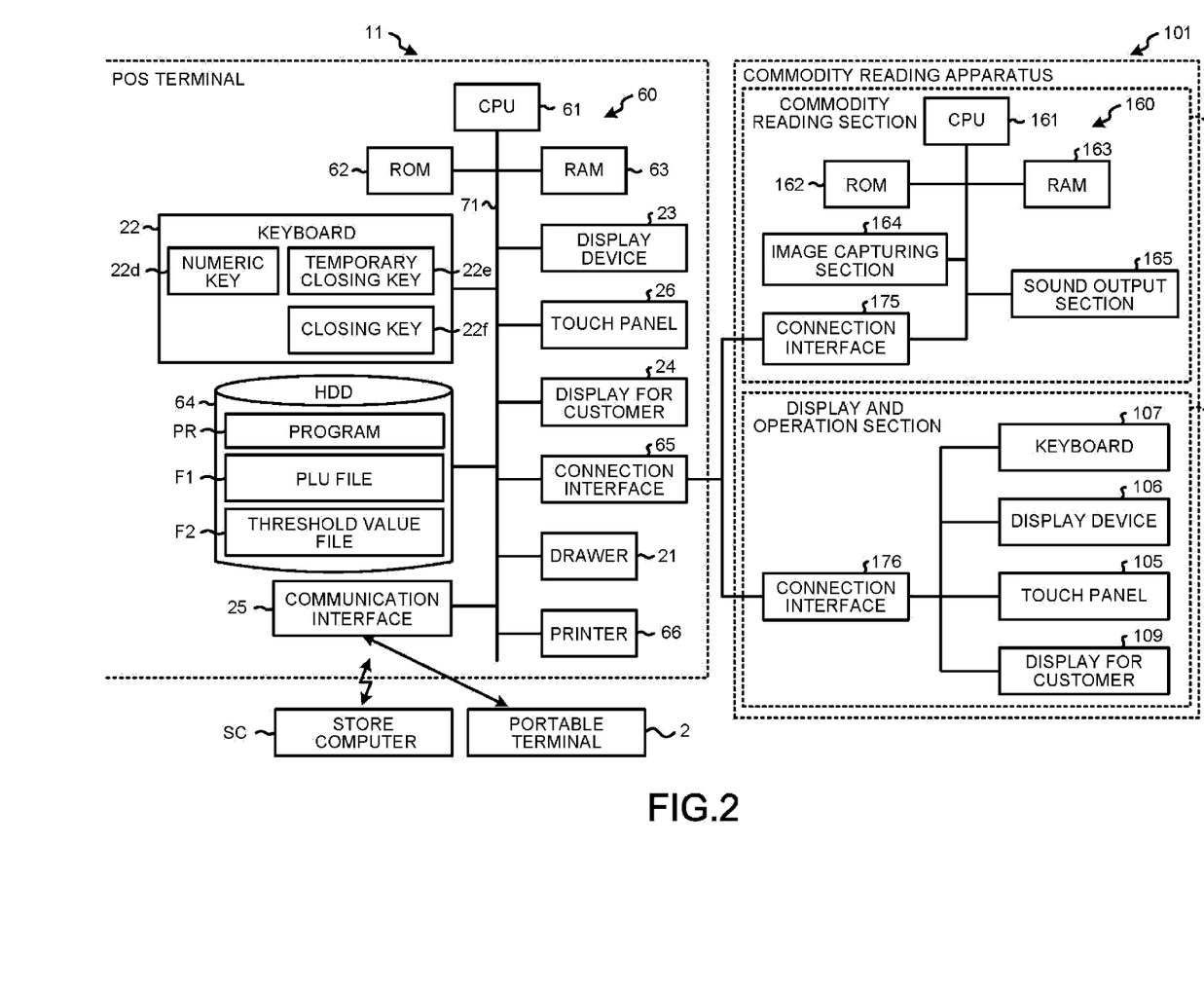
FIG. 2 is a block diagram illustrating an example of hardware arrangement of a POS terminal and a commodity reading apparatus.

FIG. 2 is a block diagram illustrating an example of hardware arrangement of the POS terminal 11 and the commodity reading apparatus 101. As shown in FIG. 2, the POS terminal 11 and the commodity reading section 110 and the display and operation section 104 of the commodity reading apparatus 101 can transmit data with each other through connection interfaces 65, 175 and 176.

The POS terminal 11 comprises a microcomputer 60 for executing an information processing. The microcomputer 60 includes a constitution in which a CPU (Central Processing Unit) 61 serving as a processor which executes various operations and controls each section is connected with a ROM (Read Only Memory) 62 and a RAM (Random Access Memory) 63 via a communication bus line 71. Further, the microcomputer 60 is connected with each piece of hardware in the POS terminal 11 through, the communication bus line 71 to send or receive a control signal and data.

The CPU 61 of the POS terminal 11 is connected with the aforementioned drawer 21, keyboard 22, display device 23, touch panel 26 and display for customer 24, which are controlled by the CPU 61, through various input/output circuits (not shown).

The keyboard 22 includes a numeric key 22d on the upper surface of which numeric characters such as '1', '2', '3' . . . and multiplying operator and the like are displayed, a temporary closing key 22e and a closing key 22f.

The CPU 61 of the POS terminal 11 is connected with an HDD 64 (Hard Disk Drive), in which programs and various files are stored. When the POS terminal 11 is started, the programs and various files stored in the HDD 64 are completely or partially copied to the RAM 63 and executed by the CPU 61. In this way, the microcomputer 60 controls each piece of hardware in the POS terminal 11. An example of the programs stored in the HDD 64 is a program PR for a commodity sales data processing. An example of the files stored in the HDD 64 is a PLU file F1 or a threshold value file F2 which is sent from a store computer SC through a communication interface 25 and then stored in the HDD 64. The PLU file F1 and the threshold value file F2 are registered in advance before a commodity checkout processing is carried out. The files will be described later.

The communication interface 25 is a unit controlling the data communication with the store computer SC or the portable terminal 2. In the present embodiment, the communication interface 25 has a device capable of carrying out communication with information devices at a distance from several to dozens of meters and carried out data communication with the portable terminal 2 using the device. Moreover, the communication interface 25 may further use a device having a communication distance of several centimeters.

The POS terminal 11 further comprises a printer 66, which outputs a receipt after the commodities purchased are subjected to checkout processing.

The commodity reading section 110 of the commodity reading apparatus 101 comprises a microcomputer 160 for executing an information processing. The microcomputer 160 includes a constitution in which a CPU 161 is connected with a ROM 162 and a RAM 163 via a bus line. The CPU 161 expands the programs (e.g. an image capturing program) stored in the ROM 162 in the RAM 163 and then executes the programs. In this way, the microcomputer 160 controls each piece of hardware in the commodity reading apparatus 101. Further, the commodity reading section 110 comprises a sound output section 165 configured to output a reading confirmation sound when reading a commodity.

The image capturing section 164, which is, a color CCD (Charged Coupled Device) image sensor or a color CMOS (Complementary Metal Oxide Semiconductor) image sensor, captures an image containing a commodity image of a supplied commodity under the control of the CPU 161. For example, the image capturing section 164 captures dynamic images at 30 fps. The frame images captured by the image capturing section 164 at a specified frame rate in sequence are stored in the RAM 163.

The operator puts the commodities in the first shopping basket 153b in front of the reading window 103 one by one, as stated above. In the commodity reading apparatus 101, the images captured by the image capturing section 164 are output to the POS terminal 11.

Figure 3:
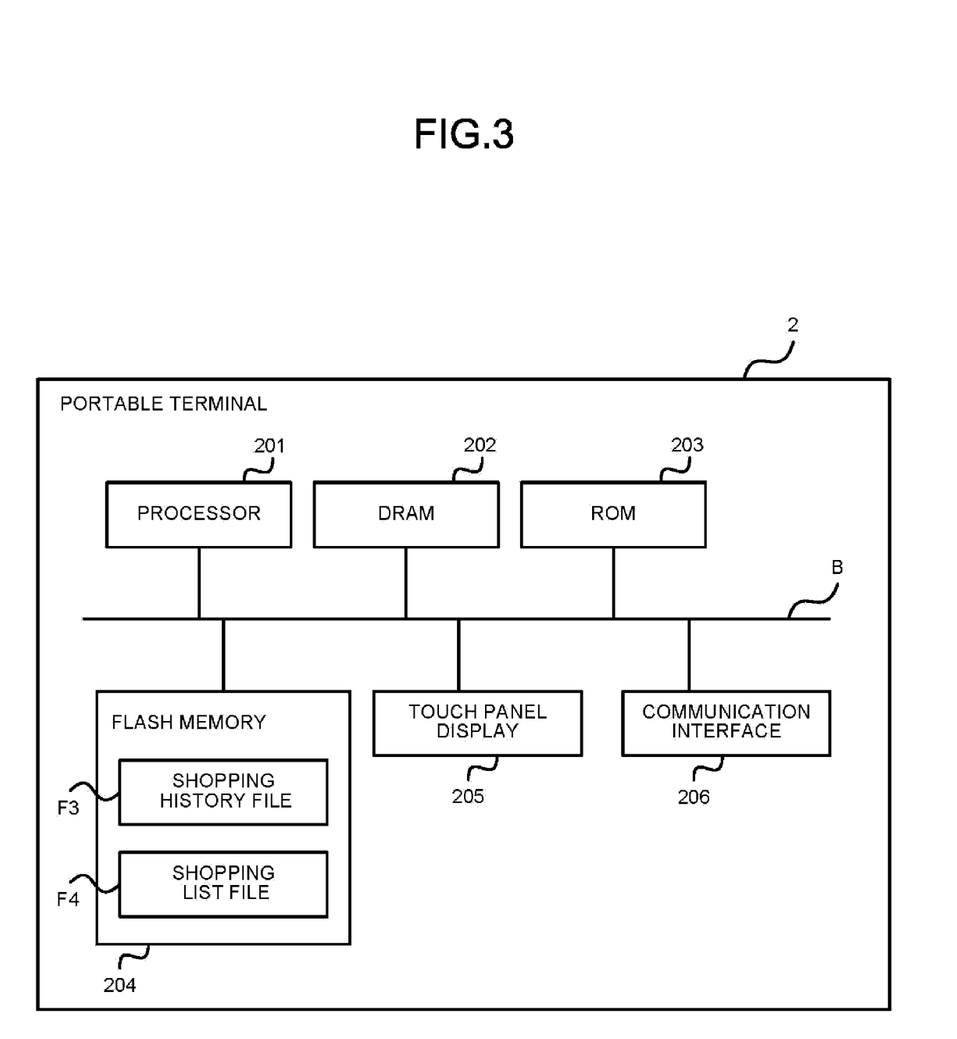
FIG. 3 is a block diagram illustrating an example of the hardware arrangement of a portable terminal.

FIG. 3 is a block diagram illustrating an example of the internal constitution of the portable terminal 2. The portable terminal 2 is, for example, a smart phone held by a customer (a customer shopping in a store). The portable terminal 2 comprises a processor 201, a DRAM (Dynamic Random Access Memory) 202, a ROM (Read Only Memory) 203, a flash memory 204, a touch panel display 205 and a communication interface 206, among which control signals and data are sent or received through a communication bus line B.

The processor 201 is, for example, an operation processing device such as a CPU (Central Processing Unit). The processor 201 carries out various processing according to the programs by loading the programs stored in the ROM 203 or the flash memory 204 into the DRAM 202 and executing the programs. The DRAM 202 is a volatile primary storage apparatus. The ROM 203, which is a non-volatile storage apparatus for permanent storage, stores the programs used when a system is started. The flash memory 204, which is an auxiliary storage apparatus for permanent storage, stores the data and program used by a user.

The flash memory 204 stores a shopping history file F3 in which the commodities purchased by a user in the past are recorded. Further, the flash memory 204 stores a shopping list file F4. The files are sent to the POS terminal 11 before a checkout processing is carried out. The shopping list file F4 is a list on which the commodities to be purchased are registered in advance by a customer at, for example, home thereof before the customer goes to a store. The shopping list file F4 may be created by accessing the homepage of a store or by using a program stored in the flash memory 204 in advance. No limitation is given to the method for creating the shopping list file F4.

The touch panel display 205 comprises a touch panel type input section and a flat panel display section. The touch panel corresponds to multi-touch for detecting a plurality of synchronous touches and obtains coordinate values (x value and y value) corresponding to the touched position. The flat panel has a light-emitting element for display on the whole panel thereof.

The communication interface 206, which is a unit taking charge of the communication with an external machine, comprises a mechanism carrying out communication through a public line network and a connector based on a USB (Universal Serial Bus) standard. Further, the communication interface 206 has a device based on a near-distance wireless communication standard and carries out data communication with the POS terminal 11 using the device.

Figure 4A:
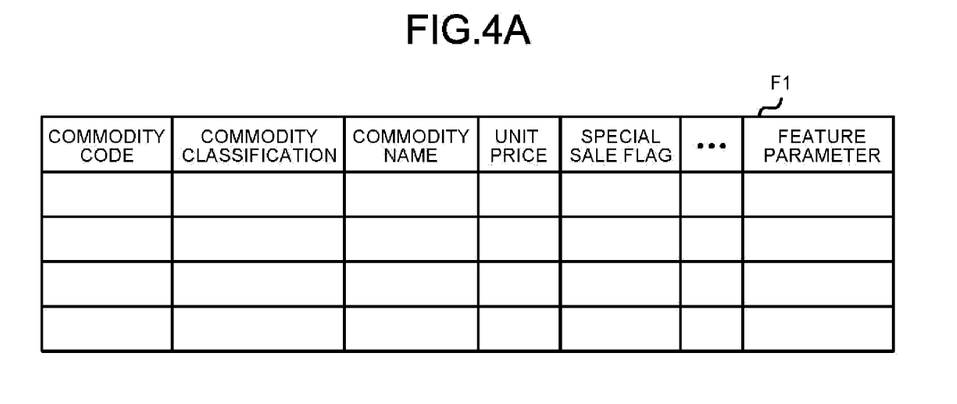
FIG. 4A is a diagram illustrating an example of a PLU file of commodities.

Next, various data used in embodiments described herein is described with reference to FIG. 4. First, FIG. 4A illustrates an example of the data constitution of a PLU file stored in the HDD 64 of the POS terminal 11. The PLU file F1 is a file in which the information relating to the sales registration of each commodity displayed and sold in a store is associated with the image of the commodity. The PLU file F1 contains information relating to a commodity, such as a commodity code uniquely assigned to each commodity, the commodity classification a commodity belongs to, a commodity name and a unit price. Commodity classification includes information of the commodity category such as 'clothing', 'foods', 'groceries' and the like. In each commodity category, for example, 'foods' may further be subdivided to 'apple', 'banana' and the like, and 'clothing' may further be subdivided to 'overcoat' and 'parka' and the like. Commodities of the same commodity category may further be subdivided according to the color or the quality of commodities.

The PLU file F1 further contains a special sale flag indicating whether or not a commodity can be purchased at a price lower than usual price. Further, the PLU file F1 contains feature amount (feature parameters) of the commodity or the path name of a commodity image obtained by photographing the commodity.

Threshold value information (threshold value file F2) such as 'similarity degree: 0.xx' is contained in the HDD 64 of the POS terminal 11. Such a threshold value as 'similarity degree: 0.xx' is a value which can be used to determine, when a commodity has a similar feature amount like apples in different categories, the commodity is similar to which category by comparing the commodity image with the commodity image pre-stored in the PLU file F1.

Figure 4B:
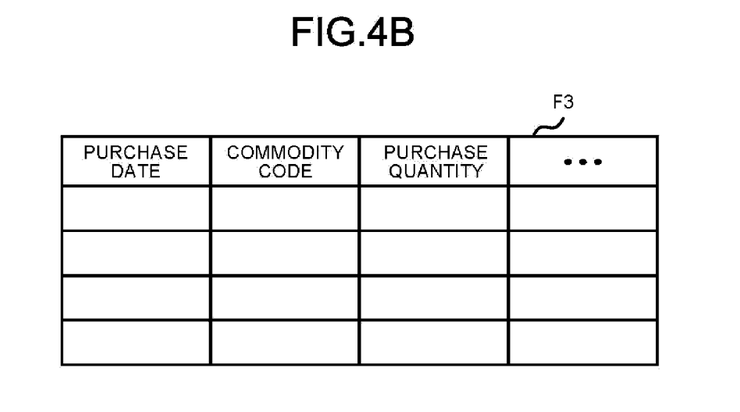
FIG. 4B is a diagram illustrating an example of the shopping history information of a customer.

FIG. 4B is a diagram exemplifying the data constitution of the shopping history file F3, Which has a data structure corresponding to a commodity purchase date, the code of a purchased commodity and the quantity of the purchased commodities. A plurality of files or folders may be used in the shopping history file F3 to associate different data. Further, the shopping history file F3 may further include a customer code which can specify the customer.

Figure 4C:
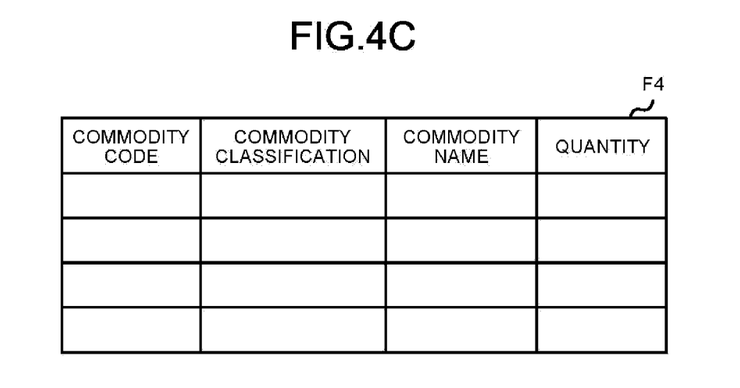
FIG. 4C is a diagram illustrating an example of shopping list information.

FIG. 4C is a diagram exemplifying the data constitution of the shopping list file F4. The shopping list file F4 is a file in which the codes, the classifications, the names and the desired quantities of the commodities to be purchased are associated with each other. Moreover, the shopping list file F4 may also be a file in which only the code and the desired quantities of the commodity to be purchased are associated with each other since the commodity classification and the commodity name can be derived by specifying the commodity code.

Sequentially, an example of the operations in a checkout processing carried out by the POS terminal 11 and the commodity reading apparatus 101 is described.

The CPU 161 of the commodity reading apparatus 101 outputs an ON-signal of image capturing to the image capturing section 164 to enable the image capturing section 164 to start an image capturing operation. After the image capturing operation is started, the CPU 161 acquires the frame images captured by the image capturing section 164 and stored in the RAM 163 in sequence. The acquirement of the frame images through the CPU 161 is carried out according to the storage order in the RAM 163. When an object is imaged in a frame image, the CPU 161 outputs the frame image to the POS terminal 11 via the connection interface 175. Whether or not an object is imaged is determined by comparing the contour line extracted from the most recent frame image with that extracted from the current frame image.

The CPU 61 of the POS terminal 11 extracts an object from the accepted frame image. Specifically, the CPU 61 extracts a contour line and the like from a binary image of the frame image.

The CPU 61 calculates the feature amount of the extracted object. The feature amount is value data representing surface states of an object, such as the size, the color and the concave-convex situation of an object. The CPU 61 reads, with reference to the PLU file F1, the feature amount from all or part of the images of the commodity captured by the image capturing section 164 of the image reading apparatus 101 to recognize the commodity in the images as a specified object. The CPU 61 compares the feature amount of the object image in the images with that of each commodity registered in the PLU file F1 in advance to specify the commodity read by the commodity reading apparatus 101.

The CPU 61 compares the feature amount of each commodity in the PLU file F1 with that of the commodity in the images to calculate a similarity degree. The similarity degree is a value representing how similar two feature amounts (value data) are to each other. The CPU 61 acquires the threshold value file F2 and determines whether or not the similarity degree exceeds a preset threshold value. In this way, the CPU 61 extracts, from the PLU file F1, the commodity the similarity degree of which exceeds the threshold value.

Recognizing an object contained in an image is called as generic object recognition. Such a conventional generic object recognition technology can be applied to the embodiments described herein. In addition, a technology is known which carries out generic object recognition by area division of the image for each object.

The CPU 61 records information relating to the sales registration associated with the recognized commodity image in the sales master file and the like and then carries out a sales registration. In the present embodiment, the information relating to a sales registration refers to the commodity code, the commodity classification, the commodity name and the unit price of a commodity specified as the commodity read by the commodity reading apparatus 101.

The object recognition is carried out according to the constitution described above. At this time, the POS terminal 11 of the present embodiment narrows down the range of the commodities to be purchased from the portable terminal 2 held by the customer based on the shopping list file F4 created before the customer comes to the store or the shopping history file F3 and carries out object recognition by taking the objects listed on the list as a first priority group. If no commodity in the first priority group is hit, the POS terminal 11 carries out object recognition using a second priority group consisting of commodities similar to those in the first priority group. The second priority group consists of other commodities similar to those in the first priority group in feature amount such as color, contour line and shape. Further, the second priority group may also consist of other commodities which belong to the same commodity classification as those commodities in the first priority group. If the object recognition cannot be carried out using the second priority group, the POS terminal 11 carries out object recognition from the rest dictionary (a third priority group). Further, the POS terminal 11 moves a commodity to the first priority group if the object in the image does not belong to the first priority group but to the second or third priority group. In this way, recognition time is shortened while recognition precision is improved.

Figure 5:
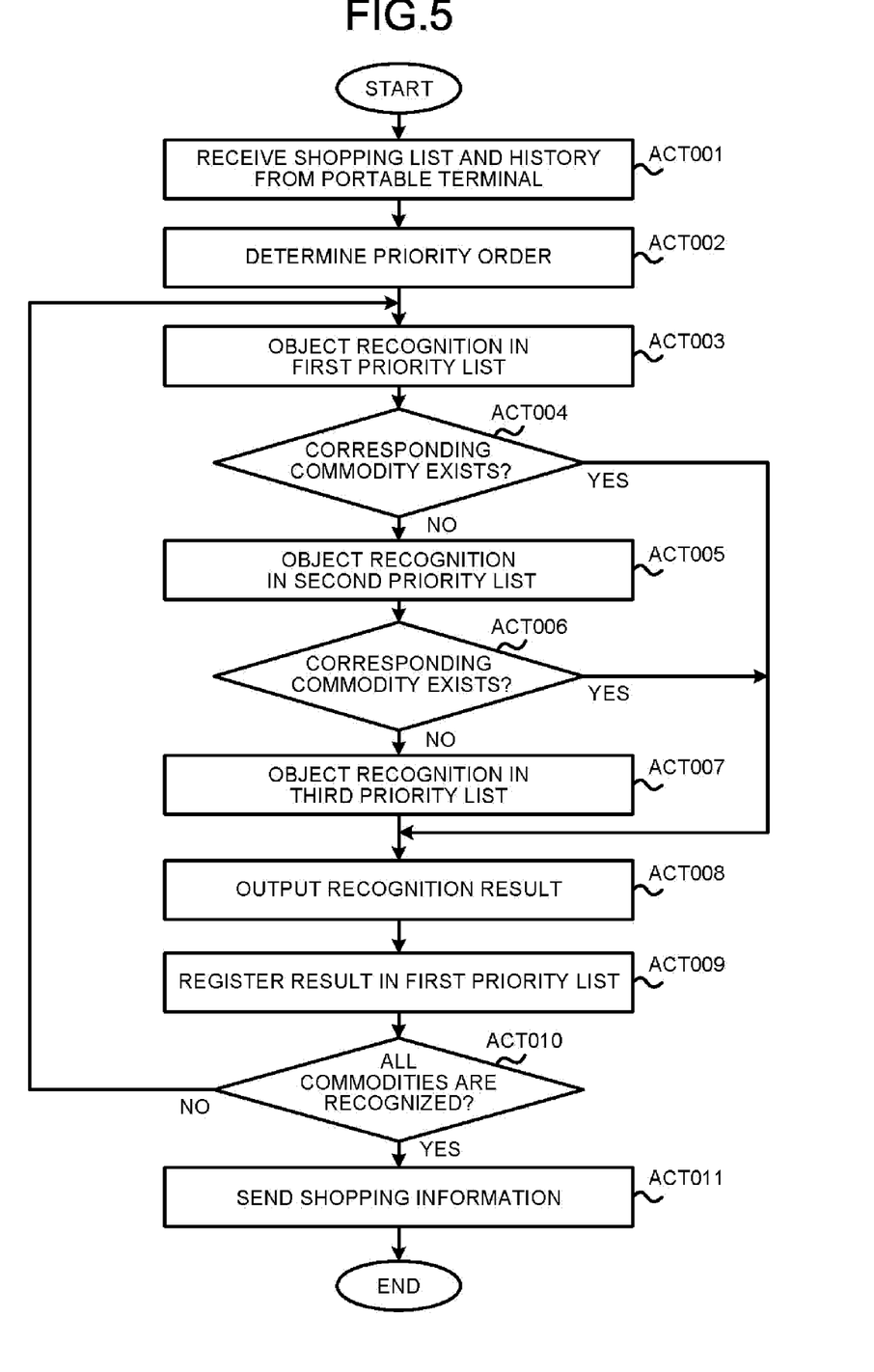
FIG. 5 is a flowchart illustrating an example of operations carried out in an embodiment.

The aforementioned operations are described with reference to the flowchart in FIG. 5.

First, the customer creates the shopping list file F4, that is, a list of the objects to be purchased before coming to a store. The shopping list file F4 is created using a dedicated application or a dedicated homepage as stated above. The shopping list file F4 contains the data of the items shown in FIG. 4C. The customer holds the portable terminal 2 in which the created shopping list file F4 is stored, and shops while viewing the list.

The CPU 61 of the POS terminal controls the communication interface 25 to receive the shopping history file F3 and the shopping list file F4 from the portable terminal 2 (ACT 001). The reception of the shopping history file F3 and the shopping list file F4 is carried out when the portable terminal 2 and the POS terminal 11 are at a distance by which communication can be carried out through the communication interfaces 205 and 206, for example, when the customer is waiting in line for settlement processing. The shopping history file F3 and the shopping list file F4 may be received automatically or manually according to an operation of the user. Further, it is applicable that only one of the shopping history file F3 and the shopping list file F4 is received.

The CPU 61 determines a priority order for object recognition (ACT 002). The CPU 61 first extracts the commodity codes registered in the shopping history file F3 and the shopping list file F4 and retrieves the PLU file F1 with the codes. The CPU 61 registers the commodities in a first priority list (a first group, the aforementioned first priority group). The list mentioned here may be a list in which the commodity code, the commodity classification, the commodity name, the unit price and the feature parameter shown in FIG. 4A are all contained in a record or a list in which the commodity code, the commodity classification, the commodity name, the unit price and the feature parameter shown in FIG. 4 are partially contained in a record (for example, only the commodity code and the feature parameter are contained in a record).

Next, the CPU 61 registers a commodity for the feature amount of which is similar to that of the commodity registered in the first priority list in a second priority list (a second group, the aforementioned second priority group) based on the feature parameter of each commodity registered in the first priority list. The CPU 61 may also register other commodities which belong to the same commodity classification as those commodities registered in the first priority list in the second priority list. For example, if 'orange' exists in the first priority group, then similar commodities such as 'grapefruit', 'tangerine' and 'navel orange' and the like are registered in the second priority list. The registration of similar commodities in the second priority list is realized by registering the association of each object in advance during the creating process of a dictionary, and in this example, is realized based on whether or not commodity classification is the same and based on feature parameters. In this example, whether or not commodity classification is the same can be determined based on the commodity classification shown in FIG. 4A. A method for determining whether or not commodities are similar based on feature parameters is described below. The feature amount of a commodity registered in the PLU file F1 is compared with that of other commodities registered in the PLU file F1 in advance in a round robin manner to calculate the similarity degree of the commodity and stores the similarity degree in the HDD 64. When a commodity registered in the first priority list is determined, the CPU 61 registers a commodity highly similar to the commodity (e.g. a commodity having a similarity degree greater than the threshold value defined in the threshold value file F2) in the second priority list. In this way, Information about whether or not feature parameters are similar is obtained by carrying out the object recognition processing which will be described later for each registered commodity in advance.

The CPU 61 registers other commodities which are not registered in the first and second priority lists in the third priority list (the aforementioned third priority group). The CPU 61 may also create new first, second and third priority lists according to, for example, the PLU file F1. Further, the CPU 61 may endow each record in the PLU file F1 with, for example, numeral data (labeling data) from 1 to 3. In this case, the numeral data correspond to priority list numbers 1 to 3.

First, the CPU 61 takes the first priority list as an ordinary and executes an object recognition processing by taking each commodity registered in the first priority list as a similarity degree comparison target (ACT 003). The object recognition processing will be described later in detail. If there is a commodity corresponding to the object captured by the image capturing section 164 in the first priority list (YES in ACT 004), the processing proceeds to ACT 008. On the other hand, if there is no commodity corresponding to the object captured by the image capturing section 164 in the first priority list (NO in ACT 004), the CPU 61 takes the second priority list as an ordinary and executes an object recognition processing by taking each commodity registered in the second priority list as a similarity degree comparison target (ACT 005). If the commodity corresponding to the object captured by the image capturing section 164 exists in the second priority list (YES in ACT 006), the processing proceeds to ACT 008. If there is no commodity corresponding to the object captured by the image capturing section 164 in the second priority list (NO in ACT 006), the CPU 61 executes an object recognition processing by taking the commodity registered in the rest commodity list, that is, the third priority list, as a similarity degree comparison target (ACT 007).

The CPU 61 displays the corresponding commodity obtained in the processing from ACT 003 to ACT 007 on, for example, the display and operation section 104 (ACT 008). In the case of error recognition, the operator operates the POS terminal 11 to make a correction manually in this phase. Herein, if the commodity finally determined is a commodity in the second or third priority list, the CPU 61 registers the commodity in the first priority list (ACT 009). That is because a case is taken into consideration where object recognition is not carried out continuously when a plurality of same commodities are purchased, thereby improving the recognition speed of the second and the following commodities and the recognition precision.

The processing from ACT 003 to ACT 009 is executed until all the purchased commodities (commodities in the first shopping basket 153a) are recognized (loop of NO in ACT 010). If all the purchased commodities are recognized (YES in ACT 010), the CPU 61 controls the communication interface 25 to send the codes of all the purchased commodities to the portable terminal 2 (ACT 011). The portable terminal 2 additionally registers the received commodity codes in the shopping history file F3. In this way, shopping history information is stored and becomes reference data for the next and the following shopping.

Figure 6:
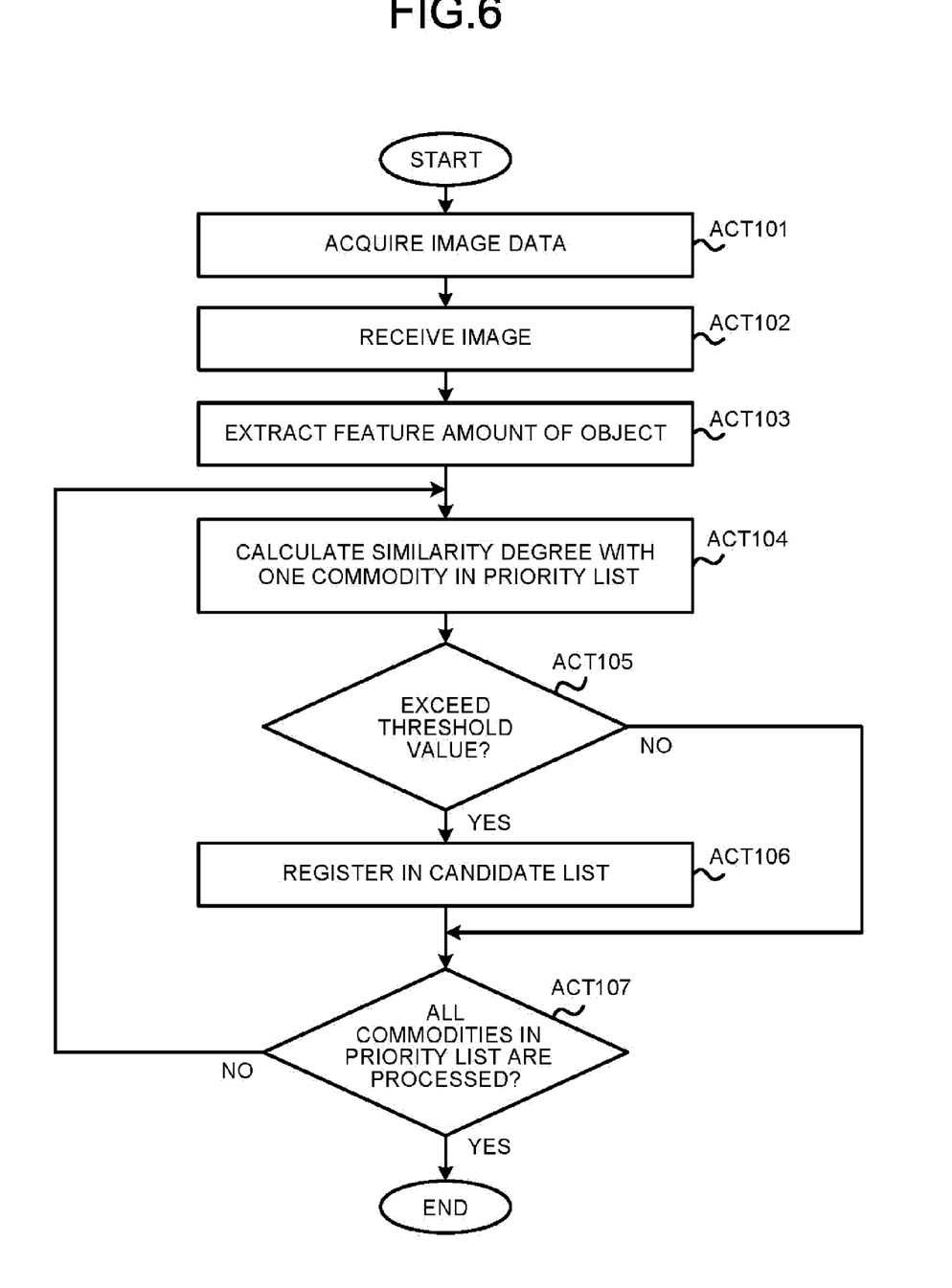
FIG. 6 is a flowchart illustrating an example of operations of object recognition shown in FIG. 5.

The object recognition processing described in ACT 003, ACT 005 and ACT 007 is illustrated with reference to the flowchart exemplified in FIG. 6.

The CPU 161 of the commodity reading apparatus 101 outputs an ON-signal of image capturing to the image capturing section 164, thereby starting the image capturing operation of the image capturing operation 164. Next, the CPU 161 carries out commodity detection according to the acquired frame images and outputs an image in which the object is imaged to the POS terminal 11. The connection interface 65 of the POS terminal 11 receives the image from the image reading apparatus 101 according to an instruction from the CPU 61 (ACT 102). The image is image data containing the captured object (commodity).

The CPU 61 extracts the feature amount of the object image (the image of a purchased commodity) in the image (ACT 103). The CPU 61 extracts the contour line, the color and the surface concave-convex situation of the object image as a feature amount. The CPU 61 compares the feature amount of each commodity in a priority list serving as a retrieval target with that of the object imaged in the image to calculate a similarity degree (ACT 104). The priority list mentioned herein refers to the first priority list in a case of the processing in ACT 003, the second priority list in a case of the processing in ACT 005 and the third priority list in a case of the processing in ACT 007. The similarity degree is a value representing how similar the object image output from the commodity reading apparatus 101 is to the commodity registered in the priority list when the similarity degree of the commodity registered in the priority list is set to be 100% (similarity degree: 1.0). Herein, the similarity degree is calculated corresponding to surface states such as contour line, color and surface concave-convex situation. When the similarity degree is calculated, the color in the feature amount may be weighted as an important element.

The CPU 61 determines whether or not the similarity degree exceeds a threshold value (the data in the threshold value file F2) (ACT 105). If the similarity degree does not exceed the threshold value (NO in ACT 105), the flow proceeds to ACT 107. If the similarity degree exceeds the threshold value (YES in ACT 105), the commodity code is registered in a candidate list (ACT 106). The processing from ACT 104 to ACT 106 is carried out for all commodities registered in the priority list (loop of NO in ACT 107). The processing is ended after all the commodities in the priority list are processed (YES in ACT 107). Further, if the commodity code is contained in the candidate list obtained in ACT 106, the result of the determination in ACT 004 and ACT 006 is 'Yes', and the commodity contained in the candidate list is displayed in ACT 008.

Compared with the conventional application in which dictionaries are used circularly to carry out object recognition, this example can carry out a matching operation from commodities with a high purchase probability and can therefore carry out a recognition processing quickly and accurately.

Further, as some customers tend to purchase bargain goods, the CPU 61 may also register a commodity the special sale flag (refer to FIG. 4A) of which is a specific value in the first priority list in ACT 002. Further, when the purchased commodities can be specified by an operator, for example, when most of the purchased commodities in the first shopping basket 153a are clothing, the operator may also designate the commodity classification using the keyboard 107 or the keyboard 22. At this time, the CPU 61 registers all or part of the commodities belonging to the commodity classification in the first priority list.

The POS terminal apparatus is equivalent to the POS terminal 11. The first interface is equivalent to the connection interface 65, and the control section is equivalent to the microcomputer 60 provided with the CPU 61. The second interface is equivalent to the communication interface 25.

In the example above, the POS terminal 11 is described as the POS terminal apparatus. Further, although the object recognition processing carried out by the POS terminal 11 is described, the object recognition processing may also be carried out by the commodity reading apparatus 101. In this case, the POS terminal apparatus becomes the commodity reading apparatus 101. Further, the POS terminal 11 and the commodity reading apparatus 101 may also be integrated into one housing, and in this case, the housing becomes the POS terminal apparatus.

In the embodiment, an example is described in which the shopping list information and the shopping history information pre-registered in the portable terminal 2 are received through the communication interface 25. The embodiment may also be as follows: a device capable of communicating with the portable terminal 2 is arranged in the commodity reading apparatus 101, and the commodity reading apparatus 101 receives the history list information and the shopping history information and transfers the received information to the POS terminal 11. In this case, the first interface becomes the connection interface 65 which receives the shopping list information and the shopping history information.

In the embodiment, the shopping history information is stored in the portable terminal 2; however, the shopping history information may also be stored in the POS terminal 11 or an external computer for customer management. In this case, in addition to the shopping list information, the communication bus line 71 or the communication interface 25 further receives the identification information of a customer, and the CPU 61 acquires, based on the identification information, the shopping history information of the customer from the customer management data in the HDD 64 or from the external computer for customer management.

In the embodiment, the commodities registered in the shopping list information and the shopping history information are taken as a high-priority first priority group, however, the commodities registered in either of the shopping list information and the shopping history information may also be taken as a high-priority first priority group. Further, besides the commodities registered in the shopping list information and the shopping history information, bargain goods or the commodities designated by the operator may also be added into the high-priority first priority group, as described above. Further, either of bargain goods or the commodities designated by the operator may be taken as the high-priority first priority group instead of the shopping list information and the shopping history information. In this case, the communication bus line 71 receives information from the touch panel 26 or the HDD 64.

By setting a priority order for registration commodities as stated in the present embodiment, the commodities with a high purchase probability in the registration commodities are processed preferentially. Thus, an object recognition processing can be carried out more quickly than the conventional object recognition processing in which all registration commodities are retrieved in each object recognition processing. Further, as the commodities with a high purchase probability are processed preferentially, the processing precision is improved.

In embodiments described herein, the functions for implementing the present invention are prerecorded in the apparatus, however, the present invention is not limited to this, the same functions may also be downloaded to the apparatus from a network or stored in a recording medium and then installed in the apparatus. No specific limitation is given to the form of the recording medium as long as the recording medium can store programs like a CD-ROM and is readable by the apparatus. Further, the functions realized by an installed or downloaded program can also be realized through the cooperation with an OS (Operating System) in the apparatus.

According to the present embodiment, an object recognition processing can be carried out more quickly and more accurately than the conventional object recognition processing which is carried out in a round robin manner.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

What is claimed is:

1. A POS terminal apparatus, comprising:
    a first interface connected to a commodity reading apparatus configured to receive image data obtained by capturing an image of a commodity purchased by a customer; and
    a control section that includes a processor, a memory and a non-volatile storage, and is configured to:
        register a priority group of commodities comprising:
            a first priority group consisting of discounted special sale items, and
            a second priority group consisting of items listed on a shopping list of the customer;
        extract a commodity belonging to the first priority group,
        compare a feature amount of each commodity in the first priority group with that of an object in the image data,
        compare, only when there is not a match between the object in the captured image of the commodity and the feature amount of each commodity in the first priority group, a feature amount of a commodity not belonging to the first priority group with that of the object in the image data, and
        determine and output identification information of the commodity purchased by the customer.

2. The POS terminal apparatus according to claim 1, wherein
    the control section acquires shopping history information of the customer and registers the commodities contained in the shopping history information in the priority group of commodities.

3. The POS terminal apparatus according to claim 1, wherein
    if the result of the comparison of the feature amount of the commodity not belonging to the first priority group with that of the object shows that the corresponding commodity does belong to the first priority group, the control section registers the captured commodity in the priority group of commodities.

4. The POS terminal apparatus according to claim 1, wherein
    the control section further registers a commodity which is set in advance as a commodity having a feature amount similar to that of the commodity belonging to the first priority group in a third priority group, compares, if the captured commodity corresponding to the object is not in the first priority group, a feature amount of each commodity in the third priority group with that of the object, and
    compares, if the captured commodity corresponding to the object is not in the third priority group, a feature amount of a commodity not belonging to any of the first and third priority groups with that of the object.

5. The POS terminal apparatus according to claim 4, wherein
    the control section registers a commodity which is predefined to be of the same category with the commodity belonging to the first priority group in the third priority group.

6. The POS terminal apparatus according to claim 1, wherein
    the control section registers a commodity belonging to the category designated by a user operating the POS terminal apparatus in the priority group of commodities.

7. The POS terminal apparatus according to claim 1, further comprising:
    a second interface configured to receive a pre-created list of commodities to be purchased, wherein
    the control section registers the commodities registered in the commodity list received by the second interface in the second priority group.

8. A commodity specification method of a POS terminal apparatus, including:
    receiving image data obtained by capturing an image of a commodity purchased by a customer;
    registering a priority group of commodities comprising a first priority group consisting of discounted special sale items, and a second priority group consisting of items listed on a shopping list of the customer;
    extracting a commodity belonging to the first priority group;
    comparing a feature amount of each commodity in the first priority group with that of an object in the image data;
    comparing only when there is not a match between the object in the captured image of the commodity and the feature amount of each commodity in the first priority group, a feature amount of a commodity not belonging to the first priority group with that of the object in the image data; and
    determining and outputting identification information of the commodity purchased by the customer.

9. A non-transitory computer-readable medium comprising instructions that, in response to execution, cause a system comprising a processor to perform operations, comprising:
    receiving image data obtained by capturing an image of a commodity purchased by a customer;
    registering a priority group of commodities comprising a first priority group consisting of discounted special sale items, and a second priority group consisting of items listed on a shopping list of the customer;
    extracting a commodity belonging to the first priority group;

comparing a feature amount of each commodity in the first priority group with that of an object in the image data;

comparing, only when there is not a match between the object in the captured image of the commodity and the feature amount of each commodity in the first priority group, a feature amount of a commodity not belonging to the first priority group with that of the object in the image data; and determining and outputting identification information of the commodity purchased by the customer.

10. The non-transitory computer-readable medium of claim 9, wherein the operations further comprise:

acquiring shopping history information of the customer; and registering the commodities contained in the shopping history information in the priority group of commodities.

11. The non-transitory computer-readable medium of claim 9, wherein if the result of the comparison of the feature amount of the commodity not belong to the first priority group with that of the object shows that the corresponding commodity does belong to the first priority group, the operations further comprise:

registering the captured commodity in the priority group of commodities.

12. The non-transitory computer-readable medium of claim 9, wherein the operations further comprise:

registering a commodity which is set in advance as a commodity having a feature amount similar to that of the commodity belonging to the first priority group in a third priority group, compares, if the captured commodity corresponding to the object is not in the first priority group, a feature amount of each commodity in the third priority group with that of the object; and comparing, if the captured commodity corresponding to the object is not in the third priority group, a feature amount of a commodity not belonging to any of the first and third priority groups with that of the object.

13. The non-transitory computer-readable medium of claim 12, wherein the operations further comprise:

registering a commodity which is predefined to be of the same category with the commodity belonging to the first priority group in the third priority group.

14. The non-transitory computer-readable medium of claim 9, wherein the operations further comprise:

registering a commodity belonging to the category designated by a user operating the POS terminal apparatus in the priority group of commodities.

* * * * *